United States Patent

Bienert et al.

[11] Patent Number: 4,681,364
[45] Date of Patent: Jul. 21, 1987

[54] SLIDING ROOF FOR VEHICLES HAVING A WIND DEFLECTOR

[75] Inventors: Horst Bienert, Gauting; Georg Kohlpaintner, Martinsried, both of Fed. Rep. of Germany

[73] Assignee: Webasto-Werk W. Baier GmbH & Co., Gauting, Fed. Rep. of Germany

[21] Appl. No.: 856,362

[22] Filed: Apr. 28, 1986

[30] Foreign Application Priority Data

Apr. 26, 1985 [DE] Fed. Rep. of Germany ....... 3515066

[51] Int. Cl.$^4$ .............................................. B60J 7/22
[52] U.S. Cl. ................... 296/217; 296/221; 296/222
[58] Field of Search ................ 296/217, 221, 222

[56] References Cited

U.S. PATENT DOCUMENTS

| 3,560,044 | 2/1971 | Helm | 296/91 |
| 3,922,032 | 11/1975 | Schaller | 296/217 |
| 3,984,143 | 10/1976 | Vermeulen | 296/217 |
| 4,332,416 | 6/1982 | Lutz et al. | 296/216 |
| 4,362,332 | 12/1982 | Garnham | 296/217 |

FOREIGN PATENT DOCUMENTS

| 514751 | 10/1952 | Belgium | 296/217 |
| 102720 | 8/1980 | Japan | 296/217 |

Primary Examiner—Robert B. Reeves
Assistant Examiner—Dennis H. Pedder
Attorney, Agent, or Firm—Sixbey, Friedman & Leedom

[57] ABSTRACT

Sliding roof for vehicles having a cover which, in a closed position, covers a roof opening of a fixed roof surface, which cover is rearwardly slideable below or above the fixed roof surface. In the area of the front edge of the roof opening, there is a pivotably mounted wind deflector, which is tiltable into an upwardly extended position by sliding the cover back, and, by way of an actuating device, is tiltable back into a retracted position when the cover is moved forward. In addition to the elements of the actuating device, there are provided two locking elements, bilaterally attached to the wind deflector, against which, in the foremost sliding position of the cover, there is contact by hold down clamping elements, which are displaceable together with the cover.

12 Claims, 2 Drawing Figures

SLIDING ROOF FOR VEHICLES HAVING A WIND DEFLECTOR

BACKGROUND AND SUMMARY OF THE INVENTION

The invention relates to a sliding roof for vehicles having a cover which, in a closed position, closes a roof opening of a fixed roof surface, and which cover is rearwardly slideable below or above the fixed roof surface. In particular, a sliding roof of this type that also has a wind deflector pivotably mounted in the area of the front edge of the roof opening, which wind deflector is tiltable by way of actuating mechanism into a raised operational position by sliding the cover back, and is tiltable back into a retracted position when sliding the cover forward.

A sliding roof of this kind is know (U.S. Pat. No. 4,332,416) which has a wind deflector that is spring-biased by an extension spring into its operating condition, and a shifting device comprising pivot arms that are hingedly attached to the deflector and cooperate with cams which are displaceable together with the cover. When sliding the cover forward, these cams run up onto the pivot arms which, on their part, press the wind deflector downwardly. The wind deflector extension spring provides a simultaneous bracing between the wind deflector, its bearing and the cam. However, due to operating conditions of the vehicle, for instance, driving on uneven roads, undesirable movements or vibrations of the wind deflector can occur, thereby causing rattling noises.

It is the objective of this invention, therefore, to further refine the design of a sliding roof structure of the kind mentioned, so that the wind deflector is more secure from undesirable movements when in its retracted position.

The invention achieves this objective by the provision of two locking elements, in addition to the actuating mechanism, that are bilaterally attached to the wind deflector, and against which in the foremost sliding position of the cover, there is contact by hold down clamping elements, which are displaceable together with the cover.

In a preferred embodiment, the wind deflector is maintained in its retracted position not only by the adjusting device, but, additionally, by the interaction of the locking elements and the hold down clamping elements. As a consequence, there is a particularly secure retention of the wind deflector in its retracted position. The interaction between the locking elements and the hold down clamps has the effect of a reinforcement of the wind deflector and serves to prevent undesirable movements and vibrations in a particularly effective manner.

When the cover, in known manner, (e.g., U.S. Pat. No. 4,332,416) is slidably guided via front sliders, in guide rails extending at opposite sides of the roof opening, the hold down clamps appropriately are secured to the front sliders or their carriers, or, respectively, are formed by components thereof. As a consequence of the sliders travelling securely in guide rails, the locking action imparted to the wind deflector, is a particularly rigid one.

The sliding roof may be a sliding and lifting roof whose cover is tiltable so as to raise its rear end above the fixed roof surface (U.S. Pat. No. 4,332,416). In such a case, the locking elements and the hold down clamps, advantageously, are adjusted so that they are essentially in uniform, mutual engagement over the entire tilting range of the cover between the closed and extended positions. In this manner, locking of the wind deflector is ensured over the full tilting range of the cover.

These and further objects, features and advantages of the present invention will become more obvious from the following description when taken in connection with the accompanying drawing which show, for purposes of illustration only, a single embodiment in accordance with the present invention.

DETAILED DESCRIPTION OF THE PREFERRED EMBODIMENT

The following is a detailed description of a sliding roof which has mirror image symmetry with regard to a central longitudinal plane of a vehicle. Consequently, only one side of the assembly, in the instant case, the left side, is shown and described, it being understood that the other side, i.e., the right side, is the mirror image thereof.

Figure 1:
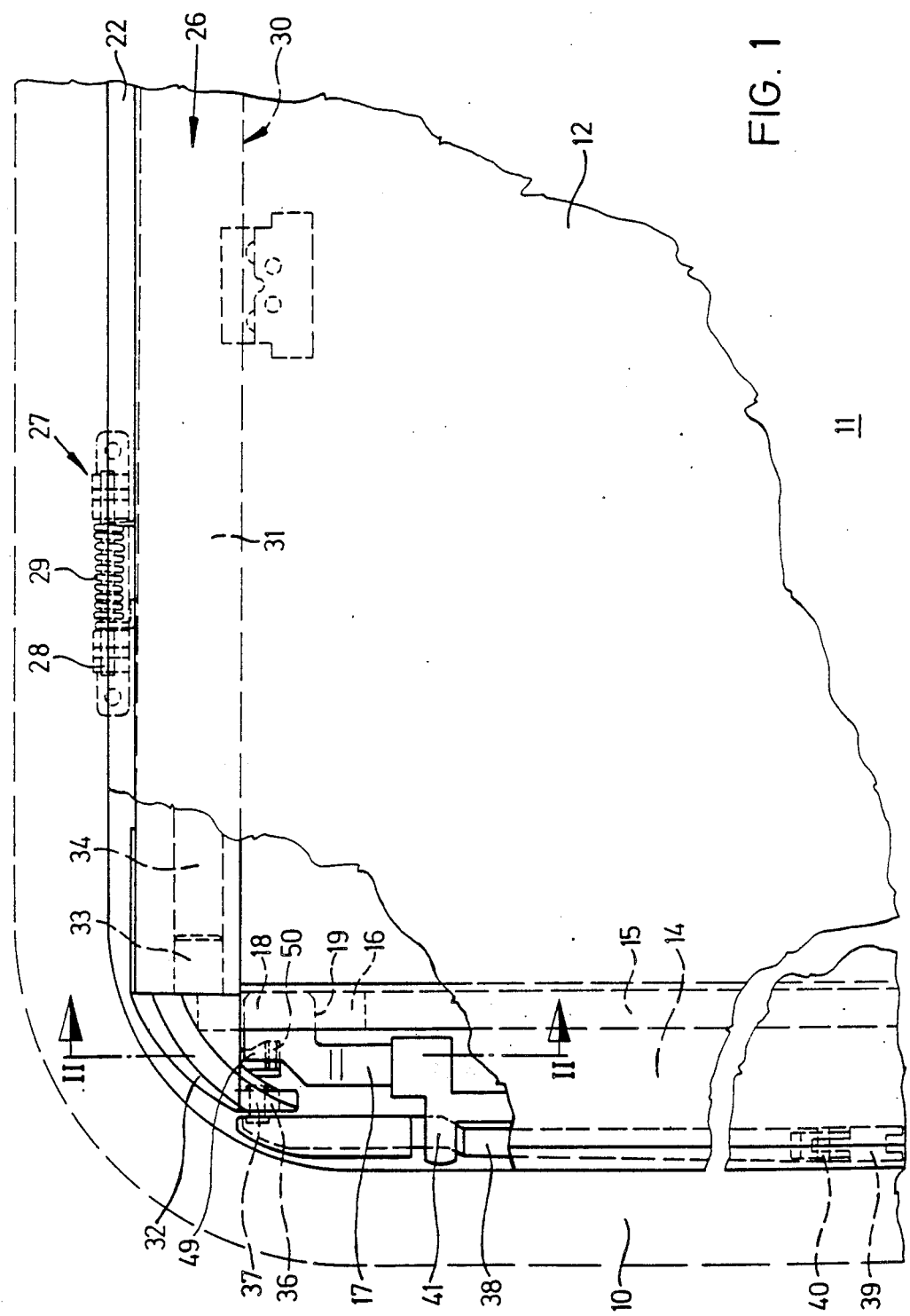
FIG. 1 is a partially broken-away schematic top view of the front left part of a sliding roof in accordance with a preferred embodiment of the invention.
Figure 2:
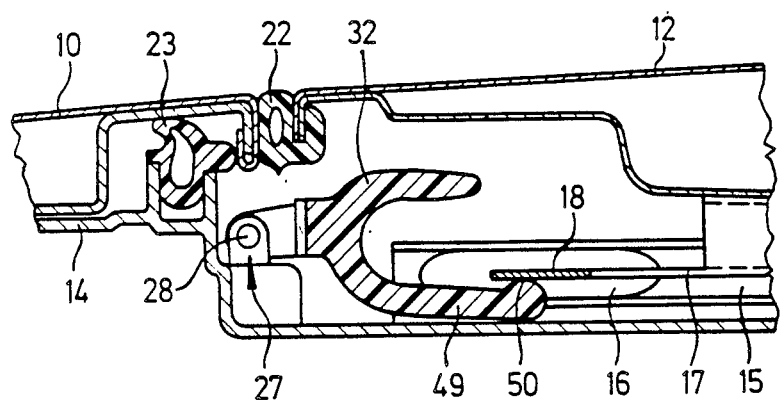
FIG. 2 is a section along line II—II of FIG. 1.

In a fixed roof surface 10 of a vehicle, particularly a motor vehicle, there is a roof opening 11, which can be closed by a rigid cover 12. Roof opening 11 is surrounded on the front and on the sides by a roof frame 14. Roof frame 14 has lateral guide rails 15 which extend in the longitudinal direction of the vehicle. The cover 12 is displaceable along guide rails 15 via slide elements in a known manner, (see, e.g., U.S. Pat. No. 4,332,416, which is incorporated by reference to the extent necessary to complete an understanding of this invention). FIGS. 1 and 2 depict front slide 16 only.

The roof may be merely a sliding roof or may be a sliding and lifting roof. In the latter case, a sliding and lifting mechanism cooperating with cover 12 is provided which may also be constructed in a known manner (e.g., U.S. Pat. No. 4,332,416). The sliding mechanism permits displacement of cover 12 between the closed position depicted in FIGS. 1 and 2, which is a forwardmost sliding end position, and an open position, in which cover 12 has been rearwardly moved below or above fixed roof surface 10 so as to at least partially expose roof opening 11.

By way of the lifting mechanism, cover 12 can be tilted so that its rear edge is raised above fixed roof surface 10 so as to serve as a ventilation flap. As a consequence, cover 12 executes a tilting movement about a pivot axis which is disposed near its front edge. This pivot axis can be formed by the left and right front side elements 16 and a slide carrier 17 interacting therewith. Slide carrier 17 cooperates with cover 12, and has a lug 18 that engages a central opening 19 of the slide element (guide shoe) 16. Slider 16 is resilient and thus accommodates the tilting movement of lug 18, which movement corresponds to the cover raising movement.

A seal 22 encircles the edge of cover 12 and, in the closed position of cover 12, seals the gap between the edge of roof opening 11 and the cover 12. Roof frame 14 has a seal 23, which sealingly contacts the elements of the fixed roof.

In the front part of roof frame 14, there is a wind deflector, designated generally by reference numeral 26. Wind deflector 26 is rotatable about an axis which extends transversely to the longitudinal direction of the vehicle. To this end, the wind deflector, in the area of its front edge, is hingedly joined with roof frame 14. Only the left hinge 27 is depicted in the drawing. Hinge 27 has a pivot pin 28 on which a torsion coil spring 29 is seated. Coil spring 29 attempts to tilt wind deflector 26 from the FIG. 1 and FIG. 2 retracted positions, in which the rear edge of the wind deflector is positioned below the closed cover 12, into an upwardly extended operating position, in which rear edge 30 of wind deflector 26 projects above the fixed roof surface 10.

In the manner described in detail in our earlier copending U.S. patent application Ser. No. 721,907 filed Apr. 11, 1985, U.S. Pat. No. 4,630,859, a wind deflector 26 can have a blade-like body member formed of a profile part 31 which has an end piece 32 at both sides. Profile part 31 for instance, may be a lightweight extruded profile (which requires no finishing steps such as machining). The end pieces 32, which may be made of synthetic material, can have lateral shoulders 33 which project inwardly, and which are inserted into a complementary recess 34 of profile part 31. End piece 32, at its outer end has an activating slot 36 which is engaged by drive pin 37 at the front end of pivot arm 38. At its other end, pivot arm 38 is connected with roof frame 14 via bearing bracket 39 and a pivot bearing 40. To the extent necessary, reference may be had to our noted co-pending application for a fuller understanding of these features.

With the cover 12 open wind deflector 26 is swung into its upwardly extended operating position and is held by the biasing force applied by coil spring 29. When cover 12 is slid forwardly into its closed position, as depicted, a cam 41, that participates in the displacement movement of cover 12, runs up pivot arm 38. Pivot arm 38 is subsequently tilted downwardly about pivot bearing 40. Drive pin 37, travelling in a forward direction in the activating slot 36, pushes the rear end of wind deflector 26 downwardly, which causes the wind deflector to be pivoted about the hinged axis 28. Appropriately, cam 41 is connected with slider carrier 17 or with another element which is displaceable together with cover 12, which element assumes a predetermined fixed height position with regard to guide rail 15, thereby ensuring that the wind deflector activation remains unaffected by a possible vertical adjustment of cover 12. Again, reference may be made to our copending application Ser. No. 721,907 for a fuller description, if necessary, of the wind deflector actuating mechanisms.

To lock wind deflector 26 into its retracted position, in accordance with the present invention, a lever-shaped locking part 49 is disposed on the end pieces of the wind deflector 32. The lug 18 of slide carrier 17 runs onto locking part 49, as shown, when cover 12 reaches it front end position, thereby holding the wind deflector down securely. Surface 50 of locking part 49, which contacts the underside of lug 18, has a slightly convex shape so as to accommodate the pivotal movement of lug 18 during the upward tilting of cover 12, while still locking wind deflector 26, in its retracted position, independent of the cover's tilting movement, in a manner overcoming the force of spring 29. Only upon the rearward displacement of cover 12 is wind deflector 26 unblocked by slide carrier 17 and, thus, able to perform its tilting movement. Since lug 18, in the cover's closed position, lies on the imaginary pivot axis of cover 12, the contact points between the vertex of surface 50 and that of lug 18, also, essentially lie on the cover's pivot axis. As a consequence, a substantially uniform engagement between locking element 49 and the hold down clamp, which is formed by lug 18, is assured over the entire tilting range of cover 12.

It is also to be understood that, basically, another hold down clamp element which is displaceable together with the cover can cooperate with locking part 49 in the manner noted with respect to the slide carrier lug 18. For instance, a hold down clamp separately attached to the cover or, moreover, the front slider, itself, may serve as a hold down clamp for the wind deflector, such as by providing the slider with a lateral projection that extends above the guide rail 15 in a manner so as to run upon to a locking part 49 correspondingly arrange in the frontal cover end position. The preferred embodiment, depicted and described above, requires a minimum of elements which are uncomplicated and have a high degree of rigidity.

While the figures in the drawing depict cover 12 as a sheet metal cover, the cover can also easily be made of transparent or translucent materials, as a so-called glass cover.

We claim:

1. Sliding roof for vehicles of the type having a cover which, in a closed position, covers a roof opening of a fixed roof surface and is mounted for rearward sliding movement, and also having a wind deflector that is pivotably mounted, in the area of a front edge of the roof opening, so as to be upwardly tiltable into an extended position by rearward sliding of the cover, and downwardly tiltable, from said extended position, by an actuating device into a retracted position when the cover is slid forward, wherein, in addition to elements of the actuating device, two locking elements are bilaterally attached to the wind deflector in a manner preventing pivotal movement therebetween and against which, in the foremost sliding position of the cover, there is contact by respective hold down clamping elements which are mounted so as to be displaceable together with the cover.

2. Sliding roof according to claim 1, in which the cover is provided with carriers to which front sliders, that are displaceable in guide rails extending longitudinally with respect to the roof opening, are mounted and wherein the hold down clamping elements are disposed in the vicinity of the front sliders and their carriers.

3. Sliding roof according to claim 2, wherein the locking elements and hold down clamping elements are positioned relative to each other in a manner enabling them to remain in substantially uniform mutual engagement even though the cover is tilted between closed and tilted-out cover positions.

4. Sliding roof according to claim 1, wherein the locking elements and hold down clamping elements are positioned relative to each other in a manner enabling them to remain in substantially uniform mutual engagement even though the cover is tilted between closed and tilted-out cover positions.

5. Sliding roof according to claim 3, wherein the clamping elements are formed by lugs by which the front sliders are mounted to the carriers.

6. Sliding roof according to claim 5, wherein the locking elements are lever-shaped and have a slightly convex upper surface portion for accommodating tilting motion of the lugs occurring during the tiltable raising of the cover without affecting the hold down effect of the clamping elements.

7. Sliding roof according to claim 6, wherein the locking elements are formed as part of end pieces of the wind deflector.

8. Sliding roof according to claim 2, wherein the clamping elements are formed by lugs by which the front sliders are mounted to the carriers.

9. Sliding roof according to claim 8, wherein the locking elements are formed as part of end pieces of the wind deflector.

10. Sliding roof according to claim 9, wherein the locking elements are lever-shaped.

11. Sliding roof according to claim 1, wherein the locking elements are formed as part of end pieces of the wind deflector.

12. Sliding roof according to claim 11, wherein the locking elements are lever-shaped.

* * * * *